July 25, 1967  E. D. MUMAW  3,332,149

INSTRUMENT FOR LOOSENING TEETH WITH HIGH-FREQUENCY VIBRATIONS

Original Filed Feb. 27, 1963  3 Sheets-Sheet 1

INVENTOR.
EVERETT D. MUMAW
BY
ATTORNEY

July 25, 1967     E. D. MUMAW     3,332,149

INSTRUMENT FOR LOOSENING TEETH WITH HIGH-FREQUENCY VIBRATIONS

Original Filed Feb. 27, 1963     3 Sheets-Sheet 2

*INVENTOR.*
EVERETT D. MUMAW

BY

ATTORNEY

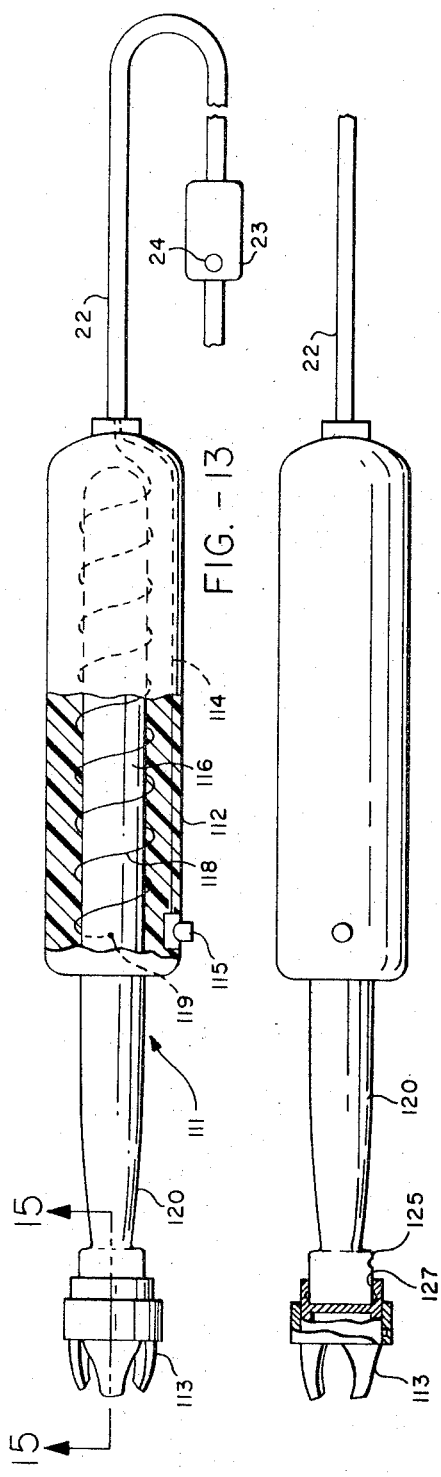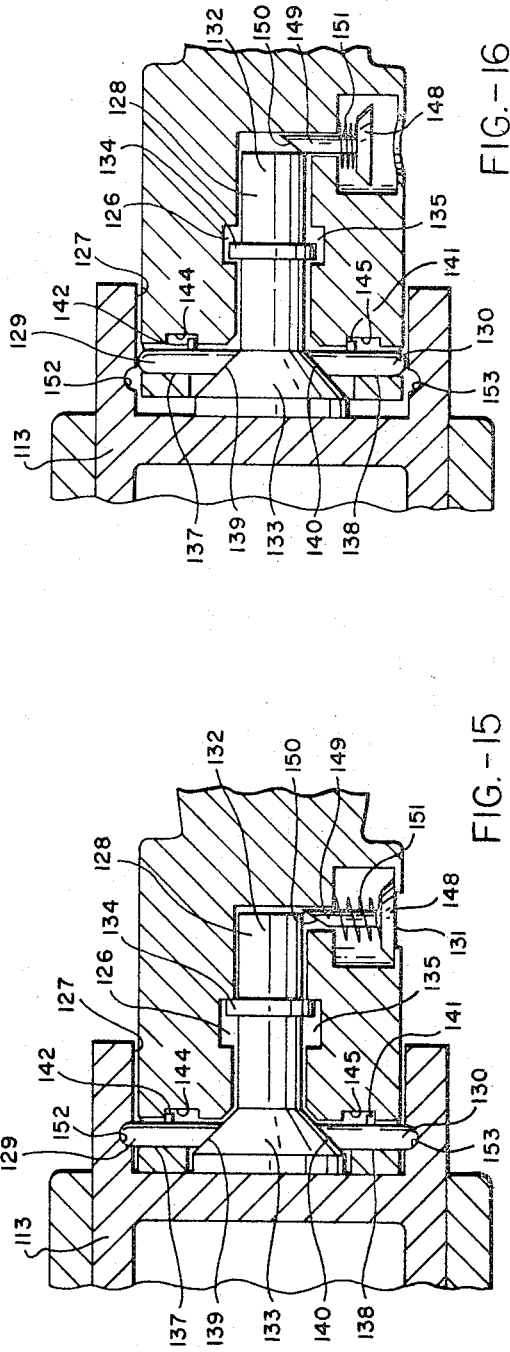

United States Patent Office 3,332,149
Patented July 25, 1967

3,332,149
INSTRUMENT FOR LOOSENING TEETH WITH HIGH-FREQUENCY VIBRATIONS
Everett D. Mumaw, 2717 Edgehill Road, Cleveland Heights, Ohio 44118
Original application Feb. 27, 1963, Ser. No. 261,399. Divided and this application Jan. 24, 1966, Ser. No. 522,518
8 Claims. (Cl. 32—14)

The present application is a division and a continuation-in-part of application Ser. No. 261,399, filed Feb. 27, 1963, now abandoned, and entitled, Stomatological Method and Device.

The present invention relates generally to stomatology and more particularly to instruments for moving a tooth in its alveolar socket for orthodontia, oral surgery, re-implantation and other dental purposes.

Prior orthodontic or re-alignment instruments and procedures are slow, painful and always in the case of surgery, accompanied by traumatic as well as neurological and psychological disturbances. In orthodontia the mechanical aids used to correct irregularities of the dental arch are uncomfortable and unsightly to the wearer and must be worn for several years to sustain tooth re-alignment. In oral surgery the various forceps used to twist, push and pull teeth cause a great deal of injury to the surrounding alveolar structure by both tearing the periodontal membrane connecting the tooth to the surrounding alveolar bone and by causing traumatic destruction of portions of the alveolar bone itself. This leaves an unnecessarily disturbed wound which is susceptible to infection, and, frequently requires a great deal of time as well as several post operative surgical and/or medical treatments before healing occurs.

Oftentimes, a substantial portion of the alveolar bone itself is lost during tooth extraction, such that the normal contours of the alveolar bone can never be restored. In these instances, irreparable damage is done to the external facial contours of the patient and therefore to his appearance because the tissues recede and shrink, such that the external covering musculature assumes a drawn and haggard look.

A rocking motion utilized in these prior tooth removal procedures can be visualized as a see-saw movement in that the tooth rocks about a fulcrum area approximately at the center of the longitudinal axis of the tooth. Such rocking motions damage the unyielding surrounding alveolar bone in generally direct relation to its rigidity of tooth retention. Further, only opposing apical and coronal ends of a tooth are moved by such rocking motions, not the fulcrum area at the center of the longitudinal axis of the tooth. It is generally impossible, therefore, to loosen a tooth in its socket by a rocking motion without damaging the alveolar bone socket.

In addition, the trauma and bone damage done by the prior instruments and procedures is heightened in view of the marked variance in lengths of the various teeth of a single person as well as between different persons. There may be over 30% difference in length of the various teeth of one person and an even more marked difference between the teeth of different persons. When rocking a tooth, the damage done to the surrounding alveolar wall is the direct function of the amplification of the vibrations produced which in turn is dependent solely upon the length of the tooth. The longer the tooth, the greater the amplification necessary and the greater will be the damage done. Large and intense amounts of trauma will be attendant the tooth removal because of the crushing of the root of the tooth against either wall as it is vibrated. The bone damage and trauma caused by using prior instruments is not eliminated by increased speeds of operation, for example, ultrasonic frequencies, alone as the rocking tooth is still being crushed against the alveolar walls. Thus, in those prior instruments utilizing high frequencies to vibrate the tooth, trauma and bone damage is not eliminated.

In these prior instruments, it is necessary generally to vary the amount of the amplification of the vibration in relation to the length of the tooth to achieve any degree of success in removing the tooth. It is therefore necessary to determine the exact length of the tooth. As the motive power used to vibrate the tooth increases in speed, the information as to exact length of the tooth must be even more precise. However, it is presently impossible to accurately predetermine the exact length of a tooth while it is in its socket.

In using these prior tooth removal instruments and procedures, lifting of the tooth is equally as indiscriminate and uncontrollable as the rocking motion and is applied during the rocking motion. With these prior instruments, a lifting force is applied during and even before the connecting fibers are severed and increase the trauma and tooth damage.

The present invention provides an instrument which relatively instantaneously and painlessly disconnects a tooth from its periodontal membrane either for realignment, such as for orthodontic purposes, or for extracting it from its alveolar socket for surgery. The present instrument rotates, reciprocates or otherwise moves the tooth in situ in an oscillating manner at an ultrasonic frequency without lifting the tooth entirely from its alveolar socket. By the term "oscillating" it is meant that the tooth is moved in a controlled manner back and forth repeatedly in at least one direction of movement between fixed limits. The back and forth ultrasonic oscillations are substantially equidistant and are sufficient in distance to cause the periodontal membrane to sever, principally at the pericemental surface of the tooth's root rather than from the surrounding alveolar bone structure. In addition, only the periodontal membrane is detached from the tooth and not the vital apical circulatory and nervous attachments so that the tooth retains its vitality and may be realigned in its alveolar socket for other dental purposes. This movement occurs with minimal trauma to the tooth as well as to the socket and with no apparent sensation to the patient. Moreover, with the tooth disconnected from the periodontal membrane, it may be easily lifted from its socket either at the same time or immediately afterwards by a minimum of effort.

In a preferred form the instrument includes a clamping head which securely fastens to the tooth, a transducer device connected to the clamping head, and suitable electrical circuitry connected to the transducer device to cause it to alternately elongate and retract at an ultrasonic frequency which elongation and retraction imparts a controlled, oscillating movement to the clamping head and to the tooth attached to it. The instrument is shaped and sized to be conveniently held in one hand of an operator. The operator thus using the present instrument can provide precise but free control as may be stomatologically desirable and/or necessary.

Accordingly, an object of the present invention is to provide a new and improved dental instrument for disconnecting a tooth from the periodontal membrane with minimal trauma to the tooth or the alveolar socket and without any apparent sensation to the patient.

Another object of the present invention is to provide a new and improved dental instrument for disconnecting a tooth from its periodontal membrane but not from its vital apical circulatory and nervous attachments so that it may be moved or repositioned in its alveolar socket for orthodontic purposes.

Still another object of the present invention is to provide a new and improved stomatological instrument which loosens a tooth within its alveolar socket without severing the vital apical circulatory and nervous attachments.

And yet another object of the present invention is to provide a new and improved stomatological instrument which can be used to relatively instantaneously remove a tooth from its socket with a minimum of traumatic disturbance to the tooth and to the socket and without apparent sensation to the patient.

Other objects and a fuller understanding of the invention may be had by referring to the following description and claims taken in conjunction with the accompanying drawings in which:

FIGURE 13 is a top longitudinal view, with portions removed, of another form of a stomatological instrument;

FIGURE 14 is a side longitudinal view of the instrument of FIGURE 13;

FIGURE 15 is a cross-sectional view in a longitudinal plane of an attachment mechanism for attaching or mechanically connecting a tooth attaching device to the stomatological instrument of the FIGURES 13, 14; and, FIGURE 16 is a view similar to FIGURE 15 showing the mechanism in a second, disconnected state as compared to the connected state of FIGURE 15.

Figure 1:
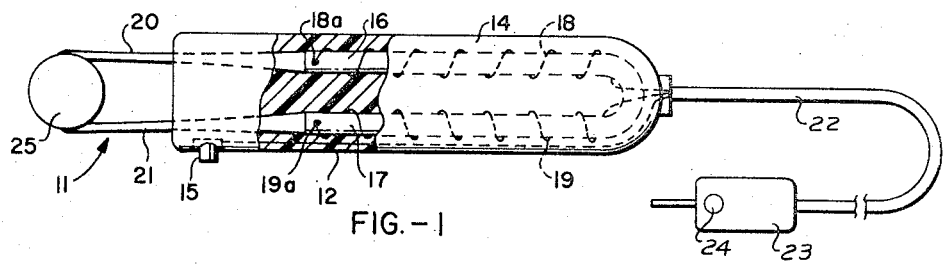
FIGURE 1 is a top longitudinal view, with portions removed, of one preferred form of the stomatological instrument of the present invention.
Figure 2:
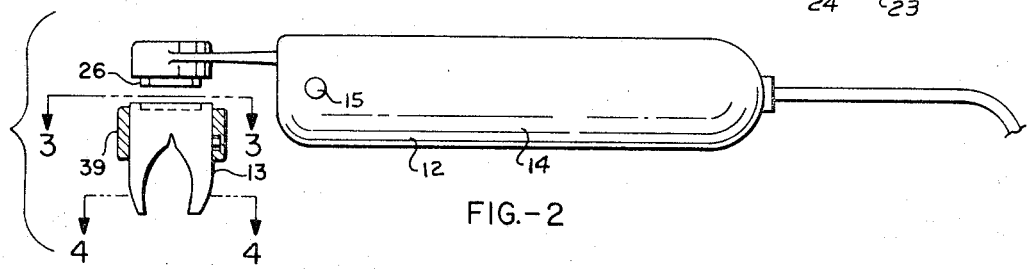
FIGURE 2 is a side longitudinal view of the instrument of FIGURE 1.
Figure 3:
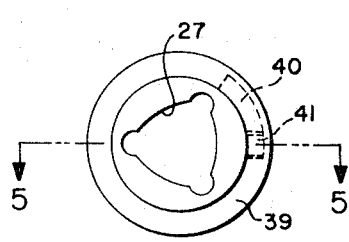
FIGURE 3 is an enlarged, top view of part of the stomatological instrument of FIGURE 1 as taken along line 3—3 of FIGURE 2.

Referring now to the drawings, wherein like reference characters indicate like or corresponding parts throughout the several views, a preferred form of a stomatological instrument is indicated generally by the reference character 11. The instrument 11 includes a handpiece 12 and a tooth attachment member 13. The handpiece 12 includes a handle 14 which houses a suitable switch mechanism operated by a push button 15. A pair of transducers 16, 17 are arranged in a spaced, parallel arrangement and extend longitudinally within the handle 14.

The transducers 16, 17 are magnetostrictive and are made of a ferromagnetic material or other suitable material which will change its dimension when placed in a magnetic field. Wire coils 18, 19 are wound longitudinally around the transducers 16, 17 respectively to simultaneously induce alternating magnetic fields in the transducers. The ends of the wire coils 18, 19 are silver soldered, or otherwise electrically connected, at 18a, 19a to the transducers 16, 17 respectively. The wire coils 18, 19 are connected by the switch 15 and a conductor 22 to the output of an ultrasonic generator 23. The ultrasonic generator 23 provides an alternating voltage output and includes a control knob 24 to select the frequency of the output from a frequency range of approximately 20 kc. to 200 kc. or more.

The polarity of the transducers 16, 17 and the arrangement of the coils 18, 19 on the transducers 16, 17 is such that as one transducer elongates the other transducer contracts. When the switch 15 is closed to connect the coils 18, 19 to the ultrasonic generator 23, the transducers 16, 17 alternately and simultaneously elongate and contract at such ultrasonic frequency.

The outermost ends of the transducers 16, 17 are connected by exponentially tapered horns 20, 21 to diametrically opposite sides of an annular driving head 25. The horns 20, 21 amplify the movements of the transducers 16, 17 and transmit this movement to the sides of the driving head 25. As one transducer retracts and the other elongates, the driving head 25 is caused to rotate about a vertical center axis. When such retraction and elongation takes place at the ultrasonic frequency of the source 23 the driving head is caused to rotatably oscillate at the ultrasonic frequency. The total rotational movement of the driving head 25 depends upon the total length differential of the transducers 16, 17 during elongation and retraction and the characteristics of the tapered horns 20, 21.

The driving head 25 includes a protruding portion 26 which snugly fits within a mating socket 27 in the top of the attachment member 13. The protruding portion 26 and the mating socket 27 are triangular with curved sides and circular apexes to eliminate any free play between the driving head 25 and the attachment member 13.

A preferred attachment member 13 is the tooth clamping head 13 shown in FIGURES 2–5. The tooth clamping head 13 includes an internal cavity 33 defined on its sides by an upper cylindrical wall 34 and three small claws 35–37. The internal cavity 33 is sized to receive the exposed portion of a tooth 38. When the clamping head is disposed over the tooth 38 the three small claws 35–37 grip the tooth at its neck which is located below the height of contour of the coronal portion of the exposed crown of the tooth.

Figure 4:
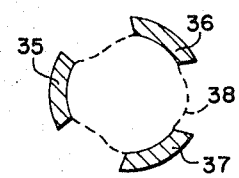
FIGURE 4 is an enlarged, section view taken along line 4—4 of FIGURE 2.
Figure 5:
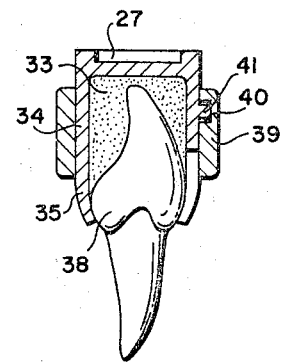
FIGURE 5 is a section view taken along line 5—5 of FIGURE 3.

When a transverse section is taken through a tooth its curvature on the outside surface of the tooth facing to the outside of the mouth is greater than its curvature on the surface or side of the tooth facing to the inside of the mouth. The outside surface of the tooth is termed the buccal surface and the inside surface of the tooth is termed the lingual surface. The claws 35–37 are arranged approximately two on the buccal side and one on the lingual side. As shown in FIGURE 4, the claw 35 is positioned near the center of the lingual surface of the tooth 38 shown in phantom. The claws 36, 37 are positioned closer to the proximal surfaces of the tooth than to its buccal surface. The claws 35–37 are locked in their gripping position about the tooth by a locking sleeve 39.

The locking sleeve 39 is slidably mounted on the outside of the clamping head 13. The locking sleeve 39 includes an inclined camming slot 40 which receives a camming pin 41 protruding from the side of the clamping head 13. Manual rotation of the locking sleeve moves it from a release position shown in FIGURE 2 to a tooth locked position shown in FIGURE 5 through the coaction of the inclined slot 40 and the pin 41. As the locking sleeve 39 is moved from the release position toward the locking position the claws 35–37 are forced radially inward and securely grip the tooth when the locking sleeve 39 is in the locking position shown in FIGURE 5. The interior surface of the locking sleeve 39 may be tapered to additionally force the claws 35–37 inwardly as the sleeve moves towards its locking position.

In some instances it is preferable to fill the space remaining between the tooth and the inside surface defining the internal cavity 33 with a putty-like substance to aid in transmitting the movement of the tooth clamping head to the tooth. One substance which has been found suitable for this purpose is silica gel.

Figure 8:
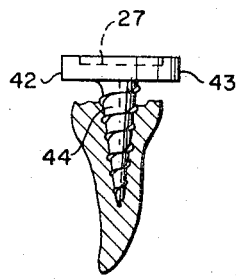
FIGURE 8 is an elevational view of an alternate form of a tooth attaching device for use with the instrument of FIGURE 1.

Since the incisors, cuspids, bicuspids, and the molars all vary in their general shape within a single mouth as well as between human beings, several different tooth clamping heads will necessarily be provided. Each such tooth clamping head will have the same socket 27 to receive the protruding portion 26 of a single handpiece.

Where a tooth is to be extracted and its crown is missing or damaged, an internal securement member 42 is provided to rigidly connect the tooth to the driving head 25 of the handpiece 12. As shown in FIGURE 8 the securement member 42 is preferably a tapered dowel 44 with suitable means for securing it to the tooth, such as the screw threads as shown, or the like. The tapered dowel is driven, as by threading, into the pulp canal of the tooth. A socket plate 43 is provided at a large end of the dowel 44 and includes the triangularly shaped socket 27 for rigid driving connection with the driving head 25.

Figure 9:
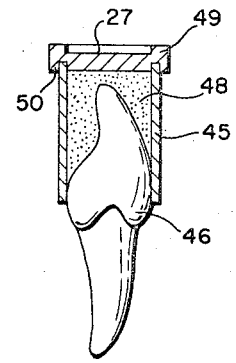
FIGURE 9 is a cross-sectional view in a longitudinal plane of another alternate form of a tooth attaching device.

Another device for connecting a tooth to the driving head 25 is shown in FIGURE 9. This device comprises an oval shaped, continuous metal band 45 which fits around the exposed portion of a tooth 46 as an impression form. A quick-setting substance 48 is placed around the tooth within the cavity defined by the metal band 45. A metal socket plate 49 having the triangularly shaped socket 27 is set on top of the substance 48. The socket plate 49 has an oval shaped groove 50 which receives the end of the band 45. After the substance 48 sets, rigidly securing the socket plate 49 and the band 45 to the tooth, the driving head 25 may be attached to the socket plate 49 for disconnecting the tooth from its periodontal membrane in the manner described above. After the tooth is removed the socket plate 49 is separated from the band 45. The band 45 is then discarded with the tooth and the socket plate 49 is retained for resterilization and reuse.

The substance 48 sets quickly within a matter of minutes with a minimum of discomfort to the patient. In addition, the substance 48, when set, has the strength to transmit the mechanical oscillating motion of the driving head to the tooth without breaking. One substance found suitable for this purpose is a quick-setting acrylic resin.

Figure 10:
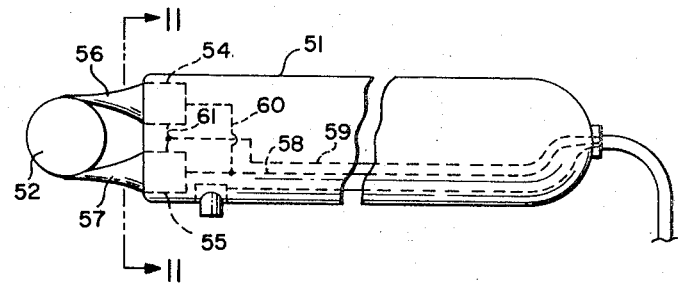
FIGURE 10 is a top view of a second preferred form of a stomatological instrument.
Figure 11:
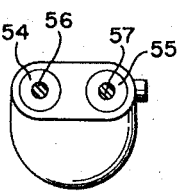
FIGURE 11 is a section end view taken along line 11—11 of FIGURE 10.
Figure 12:
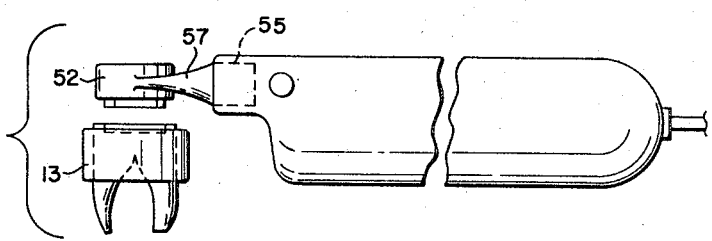
FIGURE 12 is an exploded side view of the instrument of FIGURE 10.

A second stomatological instrument is indicated generally by the reference character 51 in FIGURES 10–12. The instrument 51 is similar to the instrument 11 of FIGURES 1 and 2 and includes a driving head 52 which attaches to the tooth attachment members 13. The instrument 51 further includes a pair of cylindrical, piezoelectric transducers 54, 55 which are connected by short, exponentially tapered horns 56, 57 to diametrically opposite sides of the driving head 52. The piezoelectric transducers 54, 55 are electrically energized by conductors 58, 59, 60, 61 which connect the transducers 54, 55 in parallel. The transducers 54, 55 are identically tuned and arranged adjacent one another in the end of the handle with the exposed ends of the transducers 54, 55 in an oppositely poled relation so that energization of the transducers causes one to retract when the other elongates. Energization of the transducers 54, 55 is by an electrical signal of an ultrasonic frequency so that the transducers elongate and retract at such ultrasonic frequency. The tapered horns 56, 57 amplify the alternate elongation and retraction of the transducers 54, 55 and transmit this mechanical motion to the opposite sides of the driving head 52. The operation of the piezoelectric instrument 51 is thus very similar to that of the magnetostrictive instrument 11.

While both forms of the stomatological instrument of the present invention include two transducers for imparting a rotatable oscillating driving force, it will be recognized that other transducer arrangements, such as circular transducers, may also be employed.

Referring to FIGURES 13, 14 another form of the stomatological instrument is indicated generally by the reference character 111. The instrument 111 includes a handpiece 112 and a tooth attachment member 113. The handpiece 112 includes a handle 114, a suitable switch mechanism embedded within the handle 114 and operated by a pushbutton 115, a transducer 116 extending longitudinally within the handle 114, a wire coil 118 wound longitudinally around the transducer 116 and having an end 119 silver soldered or otherwise electrically connected to the transducer 116, an exponential horn 120 extending longitudinally forward from the end of the transducer 116, and a driving head 125 attached to the end of the exponential horn 120.

Although the present instrument is generally straight, it is to be understood that the transducer 116 and/or the horn 120 may be curved to facilitate its use in the oral cavity. The wire coil 118 is connected by the switch 115 and a conductor 22 to the output of the voltage generator 23. When the switch 115 is closed and the alternating voltage output of the generator 23 is applied to the coil 118 to induce alternating magnetic fields in the transducer 116 the transducer 116 alternately elongates and contracts at the frequency of the voltage output of the generator 23. The exponential horn 120 amplifies the movements of the transducers 116 and transmits this amplified movement to the driving head 125. As the transducer retracts and elongates, the driving head is caused to reciprocate at the frequency of the source 23.

The driving head 125 includes an attachment mechanism 126 which fits within and connects to a mating socket 127 in the tooth attachment member 113. The attachment mechanism includes a plunger 128, locking pins 129, 130 and a pushbutton release 131. The plunger 138 includes a cylindrical shaft portion 132 disposed within a longitudinally extending cylindrical cavity in the end of the driving head 125, and a head portion 133 having an outer frustoconical surface. A circular flange 134 extends radially from around a mid-portion of the shaft portion 132 and is disposed within an enlarged cylindrical cavity or recess 135.

The locking pins 129, 130 are disposed in aligned locking passages 137, 138 disposed transversely to the longitudinal axis of the plunger 128. The locking pins 129, 130 include angled camming end surfaces 139, 140 respectively which engage the frustoconical surface of the plunger head 133. Limit projections 141, 142 project from the side of the locking pins 129, 130 and are disposed within recesses 144, 145 to limit outward radial movement of the locking pins 129, 130. The pushbutton release mechanism 131 includes a pushbutton head 148, a pushbutton camming shaft 149 having a tapered end 150 and a spring 151 interposed between the pushbutton head 148 and a surface on the driving head 125 to normally bias the pushbutton so that its camming surface 150 is out of engagement with a rearward end of the plunger shaft 132.

When the driving head 125 is placed within the socket cavity 127, the forward end of the plunger 128 abuts against a bottom surface of the socket cavity causing the plunger to move rearwardly within the longitudinally extending cylindrical cavity or bore in the driving head 125 until the flange 134 abuts against a radially extending, rearward surface defining part of the enlarged annular recess 135. At this point, the outwardmost ends of the locking pins 129, 130 enter locking pin recesses 152, 153 as their camming surfaces 139, 140 slide along the frustoconical surface on the head 133 of the plunger 128. The driving head 125 is thus securely fastened to the tooth attachment device 113. Forward movement of the transducer 116 as amplified through the exponential horn 120 is transmitted from the driving head 125 to the tooth attachment device 113 through the annular flange 134, the shaft portion 132 of the plunger, and the plunger head 133 which abuts against the bottom surface of the socket 127. To remove or detach the driving head from the tooth attachment device 113, the pushbutton head 148 is pressed causing its camming surface 150 to push the plunger shaft 132 forwardly, forcing the driving head 125 rearwardly and at the same time permitting the locking pins 129, 130 to withdraw radially inward out of the locking recesses 152, 153. Rearward movement of the driving head 125 during retraction of the transducer device 116 is transmitted from the driving head 125 to the locking pins 129, 130 and thence to the tooth attachment device 113.

Stomatological method

Figure 6:
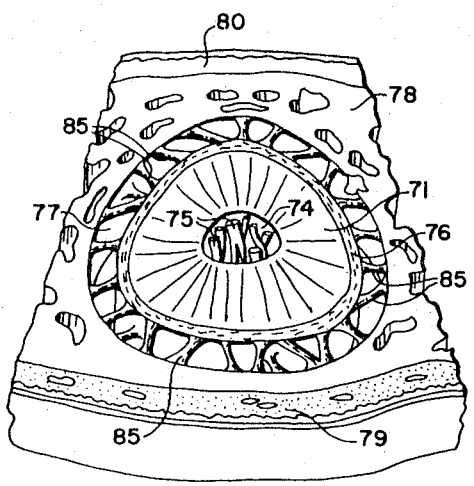
FIGURE 6 is a transverse sectional view of a typical tooth situated in its alveolar socket.

A principal use of the stomatological instrument 11 is as a realignment instrument, as for example in orthodontia. The operation of the stomatological instrument 11 can best be explained in connection with FIGURES 6 and 7 which illustrate transverse and longitudinal sections of human teeth 71, 72. As shown in FIGURE 6, the tooth 71 includes a dentin portion 73 surrounding a central pulp cavity 74. Apical blood vessels and nerves 75 run longitudinally through the pulp cavity 74. The outer surface of the dentin 73 is covered by cementum 76 and a periodontal membrane 77 connects the cementum to an alveolar bone 78. The alveolar bone 78 is enclosed by overlying gingival tissue on the buccal and lingual sides 79, 80 respectively of the tooth 51.

Figure 7:
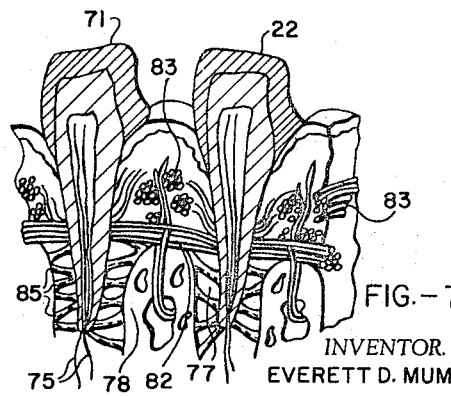
FIGURE 7 is a sectional view in a longitudinal plane of two teeth as situated in their alveolar sockets.

As shown in FIGURE 7 an interdental ligament 82 connects the teeth 71, 72 immediately above the alveolar bone 78 and the periodontal membrane 77. A circular dental ligament 83 runs transversely immediately above the interdental ligament 82. The interdental and the circular dental ligaments are two of three classes of ligaments which make up the periodontal ligament or membrane.

The third class of ligaments in the periodontal membrane comprises a plurality of tiny fiber bundles 85 which criss-cross in the space between the cementum 76 and the alveolar bone 78. These tiny fiber bundles 85 have very little, if any elasticity, but are coiled to provide a resilient connection of the tooth to the alveolar bone 78. When the tooth is caused to oscillate at the ultrasonic frequency these tiny fiber bundles are stretched beyond their limits and are ruptured. This rupturing or severing of the fiber bundles takes place substantially instantaneously upon application of an oscillating movement to the tooth 71. Where the oscillatory motion is a rotating motion about the longitudinal axis of the tooth, the periodontal fibers surrounding the sides of the root of the tooth are caused to rupture by direct extension and those attached to the apical end of the root are caused to rupture by means of a twisting over-extension. Where the oscillatory motion is a reciprocal motion along the longitudinal axis of the tooth the periodontal fibers surrounding the sides of the root as well as those attached to the apical end of the root are caused to rupture by simple over-extension. The oscillation of the tooth in its alveolar bone socket thus effectively produces a knife-like action which ruptures or severs the tiny fiber bundles. Any heat produced by the oscillation of the tooth causes the fiber bundles 85 to shrink and lose what elasticity they have and thereby aids in causing them to rupture or be severed. Since the whole operation is relatively instantaneous, any heat produced causes the patient only a momentary pain sensation of very low intensity and no permanent damage.

The above described oscillating or reciprocating movement of the tooth does not sever the apical blood vessels and nerves 75 extending longitudinally through the tooth and its pulp cavity. Where the oscillating motion is oscillatory rotation about the longitudinal axis of the tooth, the apical blood vessels and nerves are stretched slightly by a slight twist. In a similar manner, where the motion is a reciprocal movement along the longitudinal axis of the tooth, the apical blood vessels and nerves are stretched only by a slight extension. The slight stretching occurring in both of these oscillatory motions does not break or permanently damage the vital connections. The periodontal membrane is primarily a collagen with very little, if any, elasticity and which contracts upon the application of heat. The apical blood vessels and the nerves are comprised primarily of elastic muscular tissue and are not adversely affected by slight movements of the teeth. The modulus of elasticity of elastic muscular tissue is many times greater than that of collagenous fibers such as those comprising the tissue commonly known as periodontal membrane. Thus, relative to their own normal lengthwise dimensions it is possible to temporarily stretch the apical blood vessels and nerves to a much greater extent than it is possible to stretch the fibers comprising the periodontal membrane either individually or collectively. It is important to note in this relation that both the rotating and the reciprocal movements herein described are very highly controlled, not only in relation to the limited distance traversed but also with relation to a predetermined number of movements automatically accomplished during an "on cycle." It is to be further understood that mammalian nerve tissue, such as the apical nerves, has very high powers of regeneration. Thus, a limited stretching movement of the nerves occurring while rupturing the periodontal membrane does not stretch the nerve to its ultimate extent and it will repair itself relatively easily. The smaller blood vessels also have certain regenerative powers, substantially more than the periodontal membrane. Still further, the oscillations used to disassociate a tooth from a periodontal membrane are very closely controlled and limited in duration. The oscillatory movements described herein occur only for a predetermined minimal time, and a controlled distance traversed, necessary to accomplish relatively instantaneous rupturing of the periodontal membranes which are inelastic tissue, not a substantially greater time and distance necessary to rupture the blood vessels and nerves which are elastic tissue. Thus the vitality of the tooth is relatively unimpaired. Of equal importance, both the tooth and the alveolar bone are physically likewise relatively uninjured.

The tooth as thus disconnected from the surrounding alveolar bone may be moved in its socket for whatever stomatological purposes are deemed necessary at the time. Where the tooth is to be permitted to remain in the socket, as for orthodontia, the tooth may be moved and then fastened in its new position by conventional mechanical contrivances. Because minimal damage has occurred to all of the tissues involved, the tooth membrane will be refastened to the alveolar bone. Of course, where the tooth is to be removed from the socket it is academic whether or not the apical vessels and nerves are injured simultaneously with the rupturing of the periodontal membrane. In this case the tooth is completely separated from all of its attachments.

With the present instrument, removal of the tooth is accomplished with little damage to the surrounding tissues which are to remain. Very little if any alveolar bone is lost during a tooth extraction, so that the normal contours of the alveolar bone are not destroyed. No irreparable damage is done to the external facial contours of the patient, thereby avoiding a drawn and haggard look. For complete tooth removal, a lifting force to accomplish removal can be applied after the periodontal membrane has been severed and the lifting force does not have to be extreme. After the periodontal membrane is severed by the present instrument, a slight twist of the present instrument by the operator removes the tooth relatively instantaneously and cleanly from its socket with comparatively little damage to the surrounding alveolar bone. Thereafter, the socket area is replaced with new bone tissue by the usual reparative processes with comparatively no loss of the surrounding alveolar bone.

When an ultrasonic oscillation is used, the physical characteristics of the tooth are such that the tooth becomes flaccid and looses its rigidity for the duration of those moments when the ultrasonic waves are moving through the tooth. The tooth may be withdrawn from its socket during this flacid stage with practically no damage to the surrounding tissues. This withdrawal action is accomplished by the application of sufficient "on cycles" by the operator while applying a very slight lifting force to the tooth until the tooth is released from the socket. The use of ultrasonic frequencies permits very short "on cycle" times and very little, if any, bone damage.

When a tooth is oscillated as taught by the present invention at a frequency below the ultrasonic range, for example a subsonic or near subsonic range as low as 100 to 600 cycles per second, the tooth flaccidity does not occur and there is minimal stretching or expanding of the alveolar socket. In these frequency ranges, the controlled oscillatory movement of the tooth in equidistant directions while maintaining the longitudinal axis of the tooth substantially in line and holding it from rocking as taught by the present invention, provides a temporary minimal stretching of the socket and a clean rupture or severing of the periodontal membrane.

A preferred number of controlled oscillations of both the reciprocal and the rotational applications of this stomatological methods for "on cycle" periods is between 10 and 20 oscillations for the ultrasonic ranges and between 50 and 100 oscillations for frequencies below ultrasoni cranges. The predetermined number of "on cycles" are automatically provided by the source generator 23 and a connected conventional digital counter (not shown) such that activation of push button 15 produces only the predetermined number of oscillations desired.

In an average human the thickness of the periodontal membrane is approximately .3 mm. and the tiny fiber bundles of the periodontal membrane have a breaking limit approximately 17% greater than their original length. An .08 mm. movement of the tooth is required to stretch the fiber bundles to their limits. In the preferred stomatological method of the present invention a tooth movement of approximately .10 mm. is provided to assure stretching the fiber bundles beyond their limits. This .10 mm. movement of the tooth is not perceptible and little if any sensation is felt by the patient when the movement is at a high frequency, particularly an ultrasonic frequency.

Another principal advantage of the present invention is the microsecond operation required to disconnect the tooth from the periodontal membrane. Such disconnection from the periodontal membrane permits the tooth to be moved about its periodontal socket or to be extracted from the jaw, all with a minimum apparent sensation to the patient. The knife-like cutting action caused by the ultrasonically oscillating tooth causes little damage, either to the tooth or to the alveolar bone. Moreover, the present method, especially where employed to extract teeth, does not break the interdental gingival or the alveolodental ligaments, or cause laceration of the soft gingival tissue surrounding the tooth as often happens with conventional traumatic methods of extracting teeth. Thus, there is less chance of infection and a shorter time is required for complete healing of any wound.

A very distinct possible use of the present invention is in transplanting of teeth. The present method provides a clean separation of the tooth from the periodontal ligament without severing the vital apical circulatory blood vessels and the nerves. Thus the surgery required for transplanting need concern itself primarily with cutting and reconnecting the apical blood vessels and nerves.

In conclusion, the present invention may be briefly described as essentially a stomatological instrument for controllably oscillating a tooth at a high frequency within the alveolar socket between fixed limits sufficient to stretch the fiber bundles of the periodontal membrane beyond their elastic limits while maintaining the longitudinal axis of the tooth in line and holding it from rocking. In a preferred form, the instrument comprises essentially a driving head which securely clamps upon a tooth and a transducer device fixed to the driving head so as to cause it and the attached tooth to move in the controlled oscillatory manner when the transducer device is stimulated by a proper electrical signal.

Although the invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

I claim:
1. A stomatological instrument comprising:
   (a) a handle;
   (b) first and second transducers, each having one end fixed to said handle;
   (c) a driving head including claw means for fixedly gripping a tooth;
   (d) the other ends of said transducers being connected to said driving head on opposite sides of its central axis; and,
   (e) electrical means electrically associated with said transducers to selectively influence said transducers with alternating electrical energy so that one transducer elongates and the other retracts alternately at the frequency of said electrical energy.
2. The instrument of claim 1 wherein the frequency of said electrical energy is in the ultrasonic range.
3. The instrument of claim 1, including in combination:
   (g) said claw means being positionable circumferentially around a tooth and closeable to grip the tooth at its neck.
4. The instrument of claim 3, including, in combination:
   (h) means to releasably lock said claw means in a closed, tooth gripping position.
5. The instrument of claim 1, including in combination:
   (f) means including a generator and frequency selector to supply to said electrical means high frequency electrical energy that causes the transducers to rotate the driving head an angular distance that moves the tooth approximately .10 mm. to stretch the membranes attaching the tooth to the alveolar bone beyond their elastic limits.
6. A stomatological instrument for disassociating a tooth from membranes connecting the tooth to the alveolar bone, said instrument comprising a support, such as a handle, with which the instrument can be located in a stationary position relative to a tooth; means including a transducer and driving means providing an oscillating mechanical movement relative to a predetermined axis fixed with respect to the support and in response to an electrical signal; and means attached to the driving means, intersected by the said predetermined axis, and constructed and arranged to grip a tooth with the said predetermined axis passing longitudinally through the tooth; whereby the instrument oscillates a tooth while maintaining a longitudinal axis of the tooth continuously in line during the oscillation.

7. The instrument of claim 6 wherein the transducer, driving means and gripping means oscillate along a common longitudinal axis.

8. A stomatological instrument comprising a handle, transducer means carried by the handle, said transducer means providing an oscillating mechanical movement in response to an electrical signal, driving means connected to the transducer means so that the driving means oscillates with at least one axis stationary relative to the handle, and claw means connected to the driving means located along an axis that remains stationary relative to the handle, and being adapted to fixedly grasp a tooth so that oscillation of the driving means with the handle stationary relative to the tooth causes the tooth to oscillate with its longitudinal center line substantially continuously in line during the oscillating movement.

References Cited

UNITED STATES PATENTS

| | | | |
|---|---|---|---|
| 2,714,890 | 8/1955 | Vang | 128—24 |
| 2,777,198 | 1/1957 | Wallace | 32—61 |
| 2,977,683 | 4/1961 | Wiltse | 32—61 |
| 3,124,878 | 3/1964 | Bodine et al. | 32—26 |

RICHARD A. GAUDET, *Primary Examiner.*

J. W. HINEY, *Assistant Examiner.*